United States Patent
Doerflinger et al.

[19]

[11] Patent Number: 6,123,383
[45] Date of Patent: Sep. 26, 2000

[54] ARTICULATING WINDOW ASSEMBLY AND MANUFACTURING METHOD

[75] Inventors: Michael John Doerflinger; Kenneth Max Hermsdorfer, both of Lawrenceburg, Tenn.

[73] Assignee: Excel Industries, Inc., Elkhart, Ind.

[21] Appl. No.: 08/904,700

[22] Filed: Aug. 1, 1997

[51] Int. Cl.[7] ........................................................ B60J 1/00
[52] U.S. Cl. ........................ 296/146.16; 296/92; 296/201; 49/397
[58] Field of Search ................................ 296/201, 216.02, 296/92, 146.16; 49/381, 397, 398; 16/225, DIG. 13

[56] References Cited

U.S. PATENT DOCUMENTS

| | | |
|---|---|---|
| 4,139,234 | 2/1979 | Morgan . |
| 4,363,191 | 12/1982 | Morgan . |
| 4,433,930 | 2/1984 | Cosenza . |
| 4,761,916 | 8/1988 | Sanok et al. . |
| 4,777,699 | 10/1988 | Hill et al. . |
| 4,799,344 | 1/1989 | Francis . |
| 5,062,248 | 11/1991 | Kunert . |
| 5,154,028 | 10/1992 | Hill et al. . |
| 5,551,197 | 9/1996 | Repp et al. . |
| 5,560,153 | 10/1996 | Gold . |

OTHER PUBLICATIONS

*Application of RIM Urethane to One Side of Glass for Automotive Windows* by Louis R. Csokasy and Peter J. Kubizne, SAE Technical Paper Series, No. 910758, The Engineering Society for Advancing Mobility Land Sea Air and space, 400 Commonwealth Drive, Warrendale, Pennsylvania 15096–0001, U.S.A.

*Primary Examiner*—Joseph D. Pape
*Assistant Examiner*—Chad D. Wells
*Attorney, Agent, or Firm*—Banner & Witcoff, Ltd.

[57] ABSTRACT

An articulating window assembly for a motor vehicle and a method of manufacturing thereof is disclosed, the window assembly comprising a windowpane, a hinge attachment means such as one or more mounting studs for securing the windowpane to a support structure. Preferably the hinge is composed of a unitary elastomeric material such as reaction injection molded polyurethane, having a first surface lying against the inner surface in a closed position. A first portion of such first surface is bonded to the windowpane. A second portion not bonded to the windowpane is spaced therefrom in an open position. Preferably the elastomeric hinge partially encapsulates mounting studs or the like. As the articulating window assembly pivots from a closed position to an open position there is local disengagement of the hinge member from the windowpane at the second surface portion, thereby reducing the stresses on the mounting studs with respect to the hinge. In certain preferred embodiments the hinge is attached to the inner surface of the windowpane free of the outer surface. A latch mount may also be attached to the inner surface of the windowpane free of the outer surface, producing a flush mounted window assembly.

15 Claims, 5 Drawing Sheets

ARTICULATING WINDOW ASSEMBLY AND MANUFACTURING METHOD

FIELD OF THE INVENTION

The present invention generally relates to an improved articulating window. Preferred embodiments are particularly suitable for use as an articulating window in a motor vehicle.

BACKGROUND OF THE INVENTION

Known articulating window assemblies, particularly those used as flip windows in motor vehicles, have a windowpane which pivots to allow a small amount of air into the motor vehicle. Such windows are used, for example, as side windows on minivans, where a latch mount is attached near one edge of the windowpane and receives a latch attached to the motor vehicle. Operation of the latch forces the windowpane to pivot on a hinge attached near a second edge opposite the latch mount. The hinge is typically a metal bracket bonded to the windowpane by an adhesive. U.S. Pat. No. 5,551,197 to Repp et al shows one example of a flush mounted hinged window assembly using a two-part adhesive to bond a metal hinge member having holes and projections to a windowpane. However, such metal hinges as taught in Repp et al have had problems with adhesive failures when the articulating window assembly is subjected to repeated cycling between the open and closed positions, as would be expected during the normal life of the part. It would be desirable to eliminate the use of the hinge taught in Repp et al while still allowing the window to pivot or articulate reliably from a closed position to an open position.

U.S. Pat. No. 4,777,699 to Hill et al discloses a molded hinge assembly for an articulating window of a motor vehicle, having an elastomeric hinge member for a windowpane. The elastomeric hinge member of Hill et al encapsulates a portion of a mounting stud assembly which is in turn secured to a motor vehicle. The elastomeric hinge member acts both to secure the windowpane to the motor vehicle and allow the windowpane to articulate between open and closed positions. However, repeated cycling places high stresses on the mounting stud assembly, which can cause the stud to work its way out of the hinge member, resulting in failure of the part. It would be desirable to better manage stresses placed at the attachment between the windowpane and a support structure by repeated cycling of the windowpane between closed and open positions.

In view of the foregoing, it is an object of the present invention to provide an articulating window assembly which is of low cost, reduced parts and simplified assembly.

It is another object of at least certain preferred embodiments of the present invention to provide a hinge member for an articulating window assembly of a motor vehicle, which hinge member is positioned free of the outer surface of the windowpane.

It is another object of at least certain preferred embodiments of the present invention to provide an articulated window assembly which closes an opening in a motor vehicle and is positioned flush with an exterior surface of the motor vehicle.

It is yet another related object of the present invention to provide an articulated window assembly that is reliable in operation.

SUMMARY

In accordance with these and other objects, there is provided an articulating window assembly for a motor vehicle, comprising a windowpane articulatable from a closed position to an open position, a hinge and attachment means for securing the windowpane to a support structure, such as a body panel of a motor vehicle. The hinge comprises a unitary elastomeric member having first and second surfaces, the first surface having a first portion bonded to the windowpane and a second portion generally co-planar with the first portion and unbonded to the windowpane. The unbonded second portion of the first surface lies against the inner surface of the windowpane in the closed position and is spaced therefrom in the open position. Preferably the attachment means comprises one or more rigid members, e.g., mounting studs, bolts, clips or screws, at least partially encapsulated by the hinge member. The mounting studs, when used, are preferably positioned at or near the second surface. Thus, as the window assembly pivots the hinge elastically deforms and there is local disengagement of the non-bonded second portion of its first surface from the windowpane. Advantageously, this increases the distribution of loading away from the mounting studs so as to resist dislocation of the mounting studs from the hinge member. A primer can be positioned between the first portion of the first surface of the hinge member and the windowpane, greatly enhancing bonding strength.

The molded hinge or hinge member may be formed, for example, by reaction injection molding a polyol and an isocyanate to form a polyurethane. This advantageously allows for an injection molding process done under relatively low pressures and temperatures. A single hinge may be used with one or more mounting studs; alternatively, a pair of hinges may be used, especially on larger size windows. In preferred embodiments, a latch mount near a peripheral edge of the windowpane receives a latch attached to the motor vehicle. Movement of the latch by an operator forces the window assembly to pivot or articulate to an open position. To enhance exterior styling of motor vehicles, the articulating window assembly may advantageously employ one-sided bonding, so as to have the hinge member and the latch mount attached free of the outer surface of the windowpane. The outer surface may be positioned generally flush with an exterior surface of an adjacent body panel of the motor vehicle.

In accordance with another aspect, a method of making an articulated window assembly for a motor vehicle is disclosed, comprising the steps of cleaning a windowpane, applying a primer to a first area, inserting the windowpane into a mold cavity of a heated mold, closing the mold and injecting polyol and isocyanate into the mold to react and form a polyurethane elastomeric hinge having a first surface lying against the windowpane. Such first surface of the hinge extends over the primed area of the windowpane surface and an adjacent unprimed second area. The primer bonds to the windowpane and the hinge, thereby securing the windowpane to the elastomeric hinge member. Then attaching the hinge member to a motor vehicle secures the window assembly to the motor vehicle.

From the foregoing disclosure and the following more detailed description of various preferred embodiments, it will be apparent to those skilled in the art that the present invention provides a significant advance in the technology and art of articulated window assemblies. Particularly significant in this regard is the potential the invention affords for reducing the cost of the window assembly, reducing the number of parts in the assembly and thereby streamlining and speeding production, all while providing a high quality hinge member robust enough to meet stringent Original Equipment Manufacturer (OEM) requirements for motor vehicle applications, etc. Additional features and advantages of various preferred embodiments will be better understood in view of the detailed description provided below.

Figure 1:
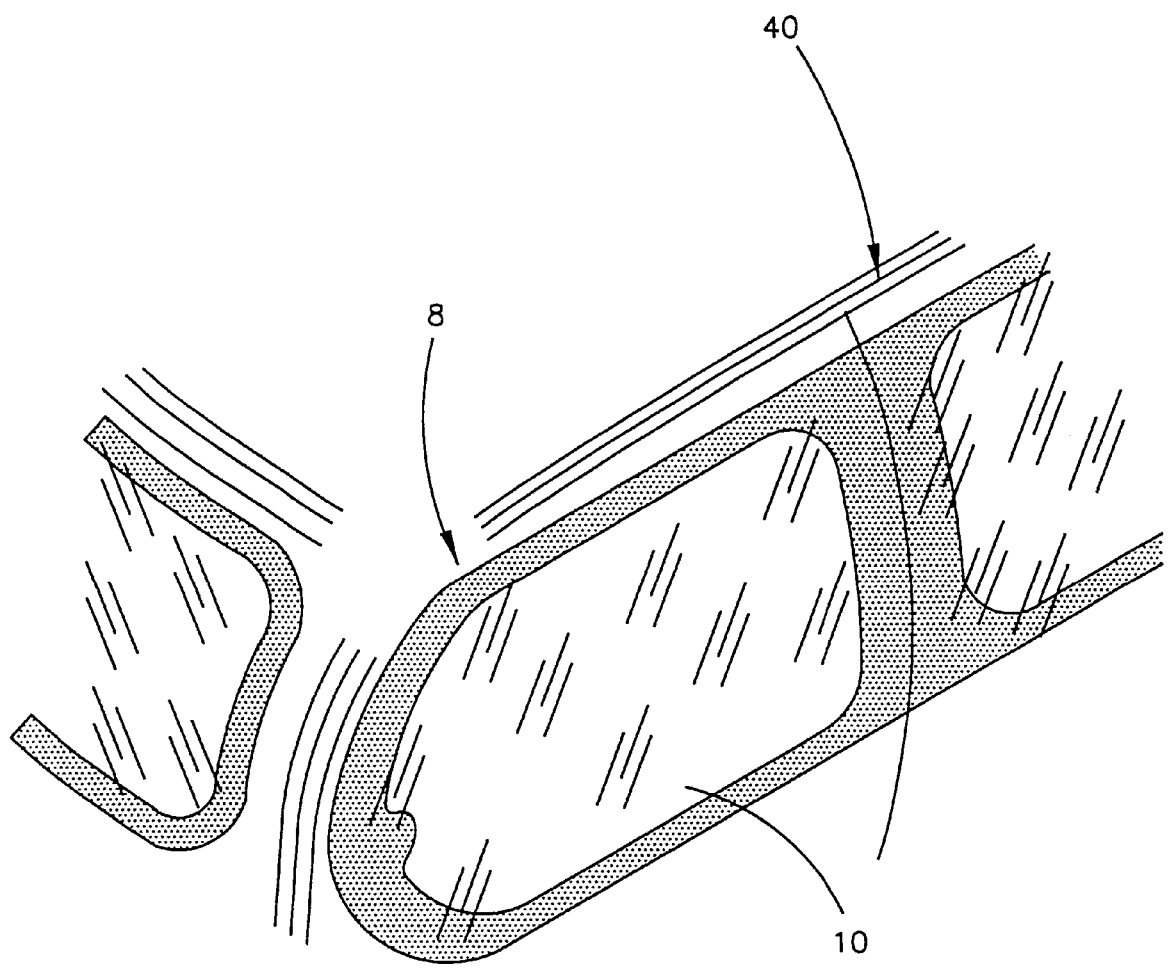
FIG. 1 is a perspective view of a flush-mounted articulated window assembly shown in assembly in a motor vehicle in accordance with a preferred embodiment.

It should be understood that the appended drawings are not necessarily to scale, presenting a somewhat simplified representation of various preferred features illustrative of the basic principles of the invention. The specific design features of an articulated window assembly as disclosed here, including, for example, specific dimensions of the hinge member and the latch mount, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the articulated window assemblies illustrated in the drawings. In general, front or frontward refers to a right direction in the plane of the paper in FIG. 2, rear, rearward or backwards refers to a left direction in the plane of the paper in FIG. 2, and inboard and outboard refer to directions normal to the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the articulated window assemblies disclosed here. The following detailed discussion of various alternative and preferred features and embodiments will illustrate the general principles of the invention with reference to a flush mounted window assembly for use as a side window on a minivan type motor vehicle. Other embodiments suitable for other applications, such as three-sided flip windows and articulating windows for pickup trucks or van conversions, will be apparent to those skilled in the art given the benefit of this disclosure.

Figure 4:
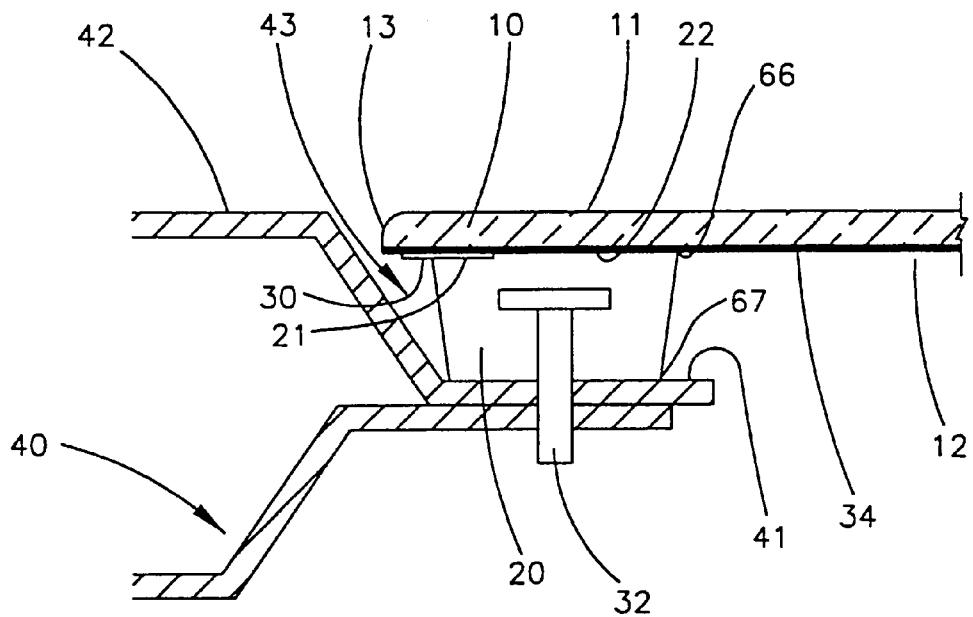
FIG. 4 is a cross sectional view, partially broken away, of the window assembly of FIGS. 1–2, taken along line 4—4 in FIG. 2, shown in a closed position.

Referring now to the drawings, FIG. 1 shows an articulating window assembly 8 in a motor vehicle body panel 40 pivotable between a closed position as shown and an open position. Window assembly 8 has a windowpane 10 having an outer surface 11, and inner surface 12, and a peripheral edge 13. For exterior styling an opaque frit 34 is positioned around the peripheral edge, concealing attachment mechanisms such as a hinge member 20 and a latch mount 50 (described in further detail below) from exterior view. Where the windowpane is made of glass, the frit is commonly a ceramic frit. It should be understood that reference here to the surface of the windowpane may mean with or without frit, primer, etc. As best shown in FIG. 4 the window assembly is seen to sit in a recess defined by a peripheral ledge 41 of body panel 40 surrounding and closing an opening 43. In certain preferred embodiments the outer surface of the windowpane is positioned generally flush with an exterior surface 42 of the motor vehicle body panel. Optionally a seal assembly may be positioned around the window assembly to prevent water, dirt and the like from entering the motor vehicle through opening 43 when the window assembly is in the closed position.

Figure 2:
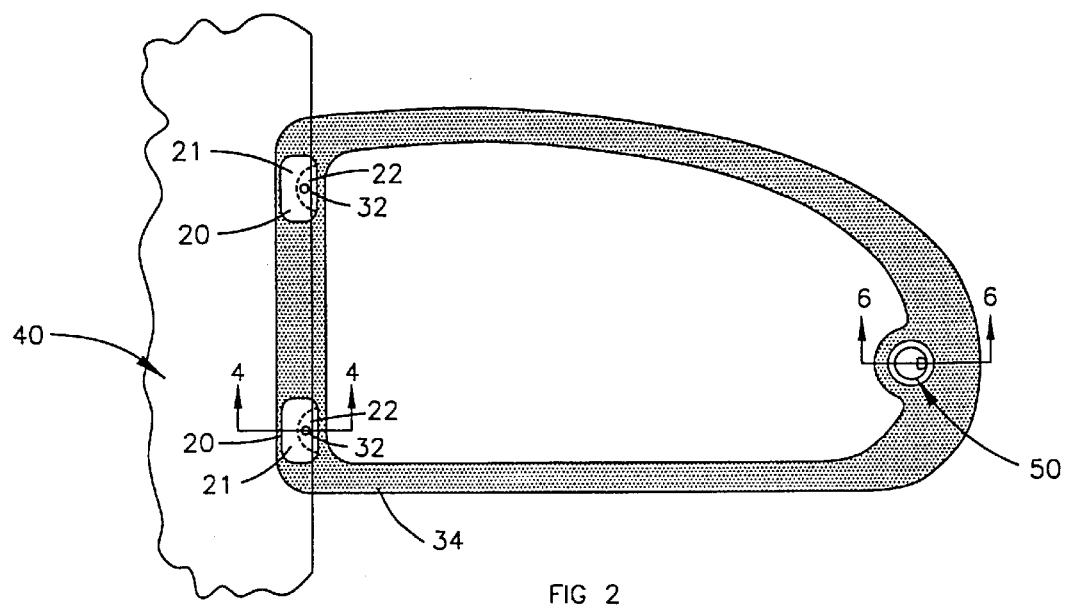
FIG. 2 is an elevation view of the inner surface of the window assembly of FIG. 1, showing an inner surface of the windowpane.
Figure 3:
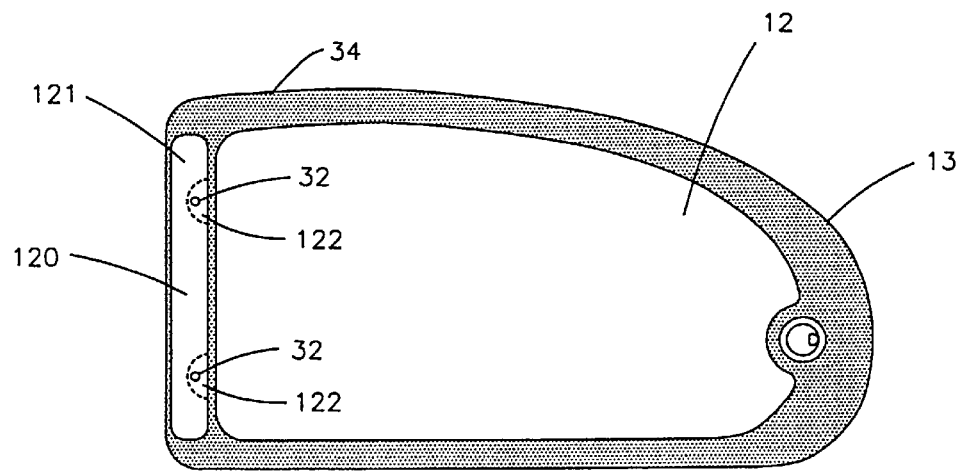
FIG. 3 is an elevation view of the inner surface of an alternative preferred embodiment of an articulating window assembly, showing an inner surface of the windowpane.

FIGS. 2 and 3 show an alternative preferred embodiments of a flush-mounted articulated window assembly. In FIG. 2 a pair of elastomeric hinges or hinge members 20 are attachable to a motor vehicle by one mounting stud 32 in each hinge member. In FIG. 3, an elastomeric hinge member 120 is attachable to a motor vehicle by attachment means such as a pair of mounting studs 32. Other suitable attachment means, such as clips, screws and bolts, two sided tapes and butyl adhesive strips will be apparent to those skilled in the art given the benefit of this disclosure.

The elastomeric hinge 20 serves several important functions. It secures the windowpane 10 to the motor vehicle by bonding to the windowpane at a first surface 66. Preferably the hinge member also encapsulates the attachment means which are in turn attached to the peripheral ledge 41 at a second surface 67 of the elastomeric hinge member. The hinge member allows the windowpane to articulate or pivot with respect to the motor vehicle by being sufficiently elastic that it can stretch as the windowpane articulates over several degrees of motion, preferably at least five degrees. Preferably the hinge 20 is composed of a reaction injection molded polyurethane (RIM material), formed by injection molding a polyol and an isocyanate together into a mold cavity of a heated mold. The shape of the mold cavity will determine the shape of the elastomeric hinge. Alternative suitable elastomeric materials for the hinge member will be apparent to those skilled in the art given the benefit of this disclosure.

In a highly advantageous feature, a primer 30 is laid down on the windowpane prior to application of the elastomeric hinge member to the windowpane. Preferably the primer is positioned near the peripheral edge on the inner surface 12 of the windowpane 10. When the elastomeric hinge member is composed of RIM material, and the windowpane in (or has a surface made of) soda-lime-silica glass, the primer is preferably a silane primer. Examples include Chemlok-144, manufactured by Lord Corporation. Without wishing to be bound by theory, it currently is believed that the surface of the glass in the windowpane has hydroxyl groups which bond with silane groups of the primer, and the polyurethane has isocyanates which react with groups on the primer which are also stable, thereby forming an excellent bond between the windowpane and the RIM material. Other combinations of primers and elastomeric hinge member materials will be apparent to those skilled in the art given the benefit of this disclosure.

In the preferred embodiments shown in FIGS. 2, 4, 5 and 7, the primer 30 is applied to the windowpane where a first portion 21 of the first surface 66 of the hinge member 20 will be positioned. The windowpane surface is left primer-free where second portion 22 of the first surface of the hinge will lie against the windowpane. In the installed window assembly, the second portion 22 is unbonded to the windowpane, other than perhaps minor contact stickiness. Such first and second portions of the hinge surface are generally co-planar with each other, both lying against the inner surface 12 of the windowpane in the closed position. In embodiments using one or more attachment studs partially embedded in the hinge, each primer-free portion preferably is positioned generally above a mounting stud 32 as viewed in FIGS. 4 and 5. Dashed lines in FIG. 2 indicate the boundary between the first and second portions of the first surface of the hinge member. Use of a primer-free segment 22 of elastomeric material positioned near or generally above each mounting stud in combination with an adjacent primed (and, hence, securely bonded) area satisfies the competing design restraints of ensuring that the hinge member is reliably affixed to the windowpane and yet is sufficiently yieldable for operation of the window assembly. It will be within the ability of those skilled in the art given the benefit of this disclosure, to select surface areas of suitable size for the bonded and unbonded portions of the first surface of the hinge member lying against the windowpane, taking into account the strength of the adhesive bond, the weight of the windowpane and the stresses or force likely to be encountered during the intended use. The size of the unbonded surface area is determined, in part by the required size of the elastomeric hinge member. Thus, one or more hinge members of suitable size are employed to handle the mounting and use forces. So much of the first surface of each is bonded to the windowpane to secure the windowpane to the motor vehicle while allowing for articulation of the windowpane with respect to the body of the motor vehicle without placing excessive stresses on the mounting stud(s) such as might cause the stud(s) to work free of the elastomeric material. In other words, the first portion 21 of the elastomeric material is bonded to the primer 30 which is in turn bonded to the windowpane. A second surface portion of elastomeric material 22 may contact the windowpane in the closed position, and in the preferred embodiments shown does in fact contact the windowpane. But the second portion does not have the enhanced adhesion characteristics associated with the primer. Consequently when the window pivots to an open position, there is local disengagement of the elastomeric material from the windowpane at the second and while the first portion remains bonded and elastically deforms. For embodiments which have more than one mounting stud it is preferable that primer-free portions 122 be positioned above each mounting stud to allow local disengagement from the windowpane at each such location (See FIG. 3).

Figure 5:
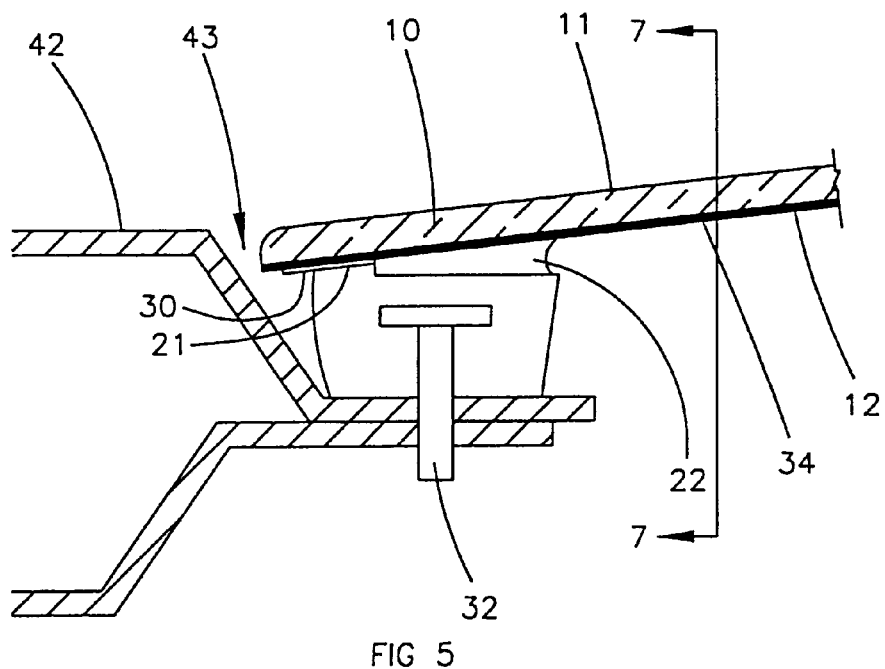
FIG. 5 is a cross sectional view corresponding to FIG. 4, shown in an open or articulated position.
Figure 7:
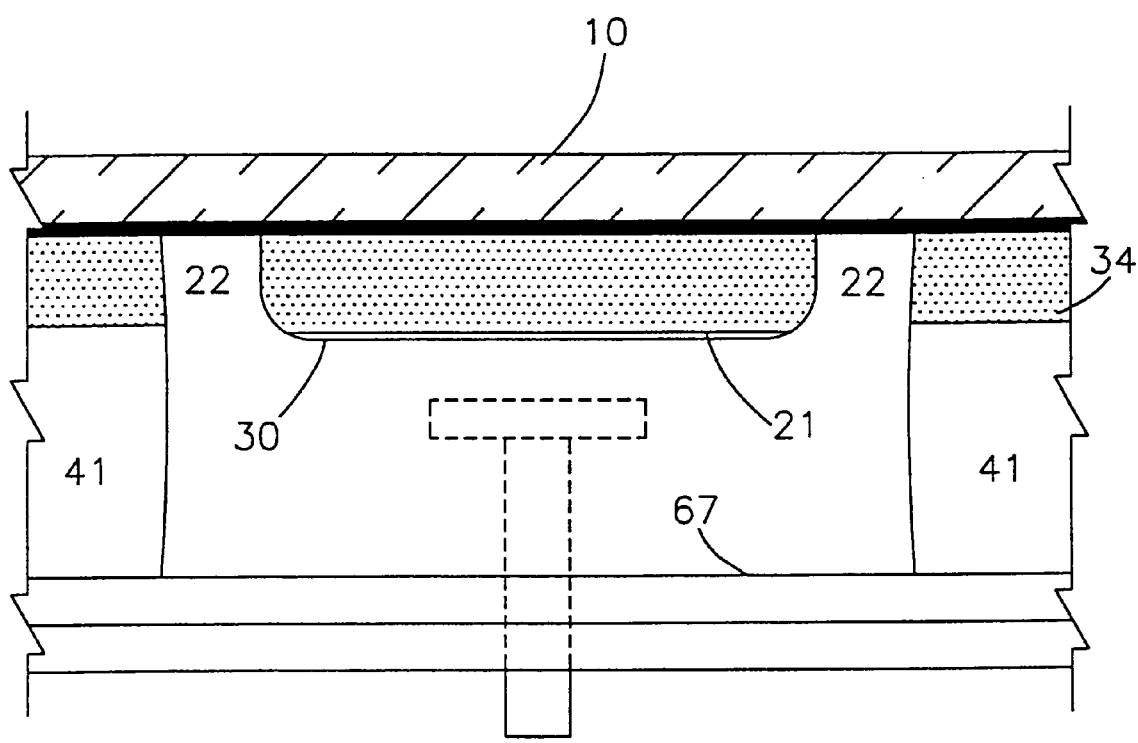
FIG. 7 is a side view of the window assembly of FIGS. 1–2, partially broken away, taken along line 7—7 of FIG. 5 and showing the open, articulated position.

FIG. 4 shows a cross sectional view of an articulating window assembly in accordance with a preferred embodiment in a closed position. FIG. 5 shows the same cross sectional view as FIG. 4 but with the articulating window assembly moved to an open position. First portion 21 of the first surface 66 of the hinge member is seen to remain bonded; the elastomeric material in that vicinity yields, i.e., elastically deforms non-distinctively to permit opening of the window. Second portion 22 is temporarily separated from the windowpane in the open position shown in FIGS. 5 and 7, advantageously reducing stresses on the mounting studs 32. This separation from the windowpane at the second portion 22 is best seen in FIG. 7. Other suitable hinge members embodying the features and design principles disclosed here will be apparent to those skilled in the art given the benefit of this disclosure.

Figure 6:
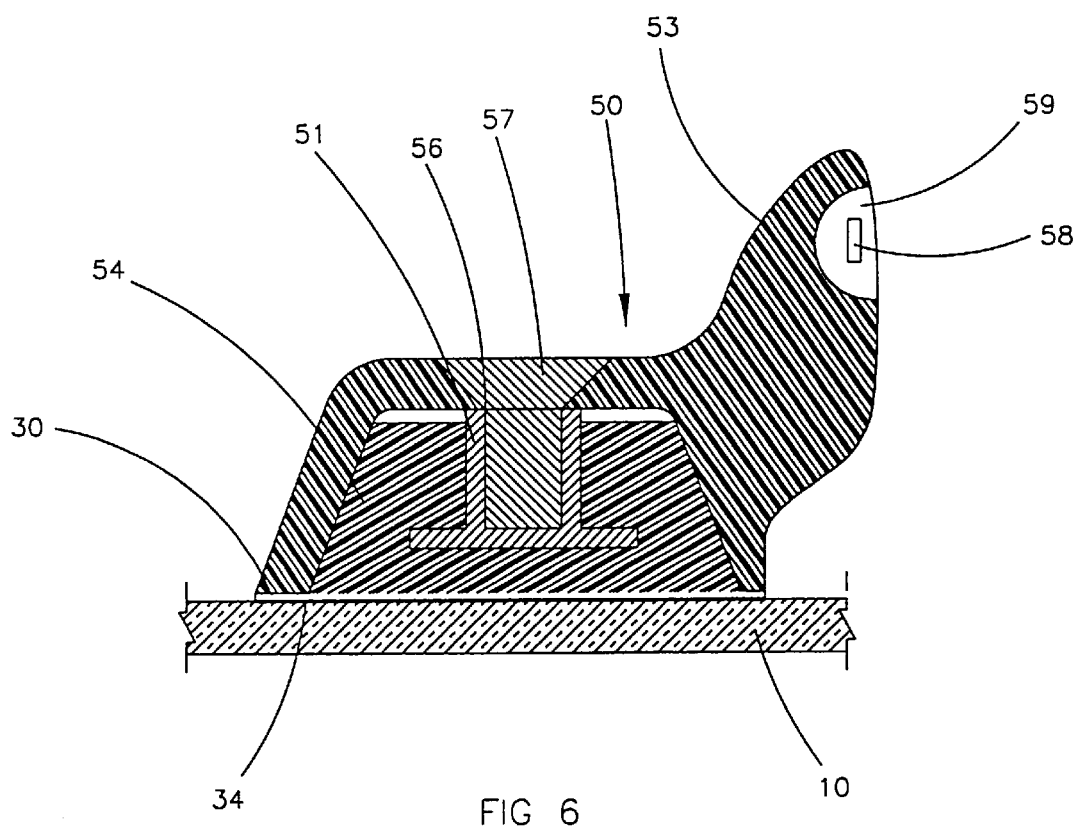
FIG. 6 is a cross sectional view of the latch mount of the window assembly of FIGS. 1–2, taken along line 6—6 in FIG. 2.

FIG. 6 shows a cross sectional view of a preferred embodiment of a flush mounted latch mount assembly 50. Preferably a latch mount 53 is secured to a base member 51 with an anchor stud 57 having a threaded opening 56. Base member 51 is preferably secured to the windowpane 10 by anchor member 54 which can be made of RIM polyurethane, for example, bonded to one side of the windowpane 10 with primer 30 in the manner discussed above. In assembly, a latch (not shown) would be attached between the motor vehicle and the latch mount at a receiving pocket 59 and secured to the latch mount at slot 58. Other flush mounted latch mount assemblies will be readily apparent to those skilled in the art given the benefit of this disclosure.

Preferably, manufacture of the articulating window assembly is accomplished by inspecting, preparing and cleaning a windowpane. Then a primer is applied to a first area of the windowpane, and to a latch mount base member area. Mounting studs and a base member 51 may be inserted into a mold cavity of a mold. The mold is then closed. Next curable material for elastomeric hinge member 20 and anchor member 54 is injected into the mold cavity, at least partially encapsulating the mounting stud(s) and the base member. The elastomeric hinge may advantageously be formed from a polyol and an isocyanate. The hinge 20 preferably extends over the first area and an adjacent unprimed second area on the inner surface of the windowpane. The primer bonds the windowpane with the hinge at a first portion of the first surface, and bonds the windowpane at the latch mount base member area to the base member. The windowpane with the hinge attached can then be removed from the mold cavity and latch mount may be attached to the base member, for example, with an anchor stud 57.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An articulating window assembly comprising, in combination:
   a windowpane having an inner surface and a peripheral edge;
   a hinge comprising
   a unitary elastomeric member having a first surface lying against the inner surface in a closed position and a second surface, the first surface having a first portion bonded to the windowpane, and a second portion not bonded to the windowpane, said second portion being spaced from said inner surface therefrom in an open position; and
   attachment means for securing the windowpane to a support structure;
   wherein the unitary elastomeric member is nondestructively flexible between the open and closed positions.

2. The articulating window assembly of claim 1 wherein the unitary elastomeric member is a reaction injection molded polyurethane.

3. The articulating window assembly of claim 1 further comprising a third portion of the first surface, not bonded to the windowpane, lying against the inner surface of the windowpane in the closed position, wherein the attachment means comprises first and second mounting studs, and the first mounting stud is partially embedded in the hinge below the second portion, and the second mounting stud is partially embedded below the third portion.

4. The articulating window assembly of claim 1 wherein the hinge is positioned adjacent to the peripheral edge of the windowpane.

5. The articulating window assembly of claim 1 further comprising a latch mount bonded to the inner surface of the windowpane.

6. The articulating window assembly of claim 1 further comprising a primer positioned between the windowpane and the first portion of the hinge, enhancing bonding to the windowpane.

7. The articulating window assembly of claim 6 wherein the primer is a silane primer and the unitary elastomeric member is a reaction injection molded polyurethane.

8. The articulating window assembly of claim 1 wherein the second surface lies in a plane substantially parallel to the first surface.

9. The articulating window assembly of claim 1 wherein the attachment means comprises a substantially rigid member at least partially embedded in the unitary elastomeric member at the second surface.

10. The articulating window assembly of claim 1 wherein the first portion of the first surface of the unitary elastomeric member can nondestructively flex by at least five degrees relative to the second portion.

11. An articulating window assembly flush mounted in a window opening defined by a body panel of a motor vehicle, comprising, in combination:

a windowpane sized to close the window opening, having an inner surface, an outer surface and a peripheral edge;

a hinge positioned free of the outer surface of the windowpane, comprising a unitary elastomeric member having a first surface and a second surface, a first portion of the first surface being bonded to the windowpane, and a generally co-planar second portion of the first surface being unbonded to the windowpane and lying against the inner surface in a closed position and spaced therefrom in an open position, the second surface being remote from the inside surface of the windowpane; and attachment means at the second surface securing the windowpane to the motor vehicle;

wherein the unitary elastomeric member is nondestructively flexible between the open and closed positions for opening of the windowpane.

12. The flush mounted articulating window assembly of claim 11 further comprising a primer positioned on the inner surface of the windowpane, bonding the hinge to the windowpane at the first portion of the first surface, and there is substantially no primer positioned on the inner surface of the windowpane at the second portion of the first surface of the hinge is positioned over the windowpane in a primer-free location.

13. The flush mounted articulating window assembly of claim 12 wherein the primer is a silane primer and the elastomeric hinge comprises a reaction injection molded polyurethane.

14. The flush mounted articulating window assembly of claim 11 further comprising a latch mount assembly mounted free of the outer surface, comprising a plastic latch mount, a latch mount primer layer and a base member, wherein the primer layer bonds the base member to the inner surface of the windowpane, and the latch mount is secured to the base member.

15. The flush mounted articulating window assembly of claim 14 wherein the base member comprises a reaction injection molded polyurethane which partially encapsulates an anchor stud having a screw receiving hole, and further comprising a threaded bolt sized to fit in the hole.

\* \* \* \* \*